United States Patent
Bergman et al.

(10) Patent No.: US 10,121,362 B1
(45) Date of Patent: Nov. 6, 2018

(54) NETWORKED ELECTRONIC ARTICLE SURVEILLANCE SYSTEMS WITH SYNCHRONIZED TRACKING

(71) Applicants: Adam S. Bergman, Boca Raton, FL (US); Manuel Soto, Lake Worth, FL (US); Michael Del Busto, Lake Worth, FL (US)

(72) Inventors: Adam S. Bergman, Boca Raton, FL (US); Manuel Soto, Lake Worth, FL (US); Michael Del Busto, Lake Worth, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 15/677,556

(22) Filed: Aug. 15, 2017

(51) Int. Cl.
G08B 29/18 (2006.01)
G08B 13/24 (2006.01)
H04W 56/00 (2009.01)

(52) U.S. Cl.
CPC ....... *G08B 29/185* (2013.01); *G08B 13/2402* (2013.01); *H04W 56/00* (2013.01)

(58) Field of Classification Search
CPC ............ G08B 13/2402; G08B 13/2488; G08B 13/2465; G08B 13/2471; G08B 13/2482; G08B 29/185; H04W 56/00; H04W 56/0015; H04W 56/001; H04W 56/002; H04W 56/0035; H04W 56/004; H04W 56/005; H04W 56/0055; H04W 56/0065; H02J 50/12; H02J 50/80

See application file for complete search history.

(56) References Cited

U.S. PATENT DOCUMENTS

| | | | | |
|---|---|---|---|---|
| 5,995,002 A * | 11/1999 | Fallin | ................. | G08B 13/2488 340/505 |
| 6,201,469 B1 * | 3/2001 | Balch | ................. | G08B 13/2488 340/10.1 |
| 6,320,507 B1 * | 11/2001 | Strzelec | ............. | G08B 13/2488 340/10.1 |
| 6,812,843 B2 * | 11/2004 | Soto | ....................... | G08B 29/26 340/538.13 |
| 7,212,117 B2 * | 5/2007 | Frederick | ........... | G08B 13/2488 340/10.1 |
| 8,106,777 B2 * | 1/2012 | Soto | .................... | G08B 13/2488 340/10.1 |
| 9,251,680 B2 * | 2/2016 | Alicot | ................ | G08B 13/2488 |

(Continued)

*Primary Examiner* — Joseph Feild
*Assistant Examiner* — Sharmin Akhter
(74) *Attorney, Agent, or Firm* — Fox Rothschild LLP; Robert J. Sacco; Carol E. Thorstad-Forsyth

(57) ABSTRACT

Systems and methods for operating an Electronic Article Surveillance ("EAS") system. The method comprising: receiving, by an electronic device, a synchronization signal transmitted from a remote Wireless Device Manager ("WDM"); performing first transmit and receive operations at the electronic device that are synchronized in accordance with the remote WDM's AC power line zero crossing specified by the synchronization signal; detecting when the synchronization signal is no longer being received by the electronic device; and performing second transmit and receive operations at the electronic device that are synchronized in accordance with the electronic device's local AC power line zero crossing, when the synchronization signal has not been received by the electronic device for a specified period of time.

14 Claims, 6 Drawing Sheets

(56) References Cited

U.S. PATENT DOCUMENTS

| | | | |
|---|---|---|---|
| 9,576,455 B2* | 2/2017 | Yang | G08B 13/2477 |
| 2009/0051534 A1* | 2/2009 | Aguirre | G08B 13/2488 340/572.1 |
| 2010/0148932 A1* | 6/2010 | Oakes | G08B 13/2488 340/10.2 |

* cited by examiner

NETWORKED ELECTRONIC ARTICLE SURVEILLANCE SYSTEMS WITH SYNCHRONIZED TRACKING

FIELD

This document relates generally to Electronic Article Surveillance ("EAS") systems. More particularly, this document relates to systems and methods for providing networked EAS systems with synchronized tracking.

BACKGROUND

Historically, EAS systems have been deployed in an autonomous fashion, i.e., the EAS systems were not connected to each other or to a device manager as taught by U.S. Pat. No. 6,201,469 to Balch et al. ("Balch"). Each EAS system's synchronization has been derived from a zero crossing of a local Alternating Current ("AC") source (where the item is plugged in). If an EAS system is not synchronized, the EAS system experiences poor pick performance or false alarms.

SUMMARY

The present disclosure concerns implementing systems and methods for operating an Electronic Article Surveillance ("EAS") system. The methods comprise: receiving, by an electronic device, a synchronization signal transmitted from a remote Wireless Device Manager ("WDM"); performing first transmit and receive operations at the electronic device that are synchronized in accordance with the remote WDM's AC power line zero crossing specified by the synchronization signal; detecting when the synchronization signal is no longer being received by the electronic device; and performing second transmit and receive operations at the electronic device that are synchronized in accordance with the electronic device's local AC power line zero crossing, when the synchronization signal has not been received by the electronic device for a specified period of time. The electronic device comprises an EAS detection system or a WDM other than the remote WDM.

In some scenarios, the method further comprises: logging a first time at which the synchronization signal is received by the electronic device; using the first time to determine a second time at which the remote WDM's AC power line zero crossing occurred taking into account known transmission delays; determining a third time at which the electronic device's local AC power line zero crossing occurred; determining a delta value specifying a time difference between the second and third times; and adding the delta value to the third time to obtain a fourth time. The second transmit and receive operations performed at the electronic device are synchronized in accordance with the fourth time.

In those or other scenarios, the methods comprise: detecting when the synchronization signal is once again being received by the electronic device; and performing third transmit and receive operations by the electronic device that are synchronized in accordance with the synchronization signal, when the synchronization signal is once again being received by the electronic device.

DESCRIPTION OF THE DRAWINGS

The present solution will be described with reference to the following drawing figures, in which like numerals represent like items throughout the figure.

DETAILED DESCRIPTION

Figure 1:
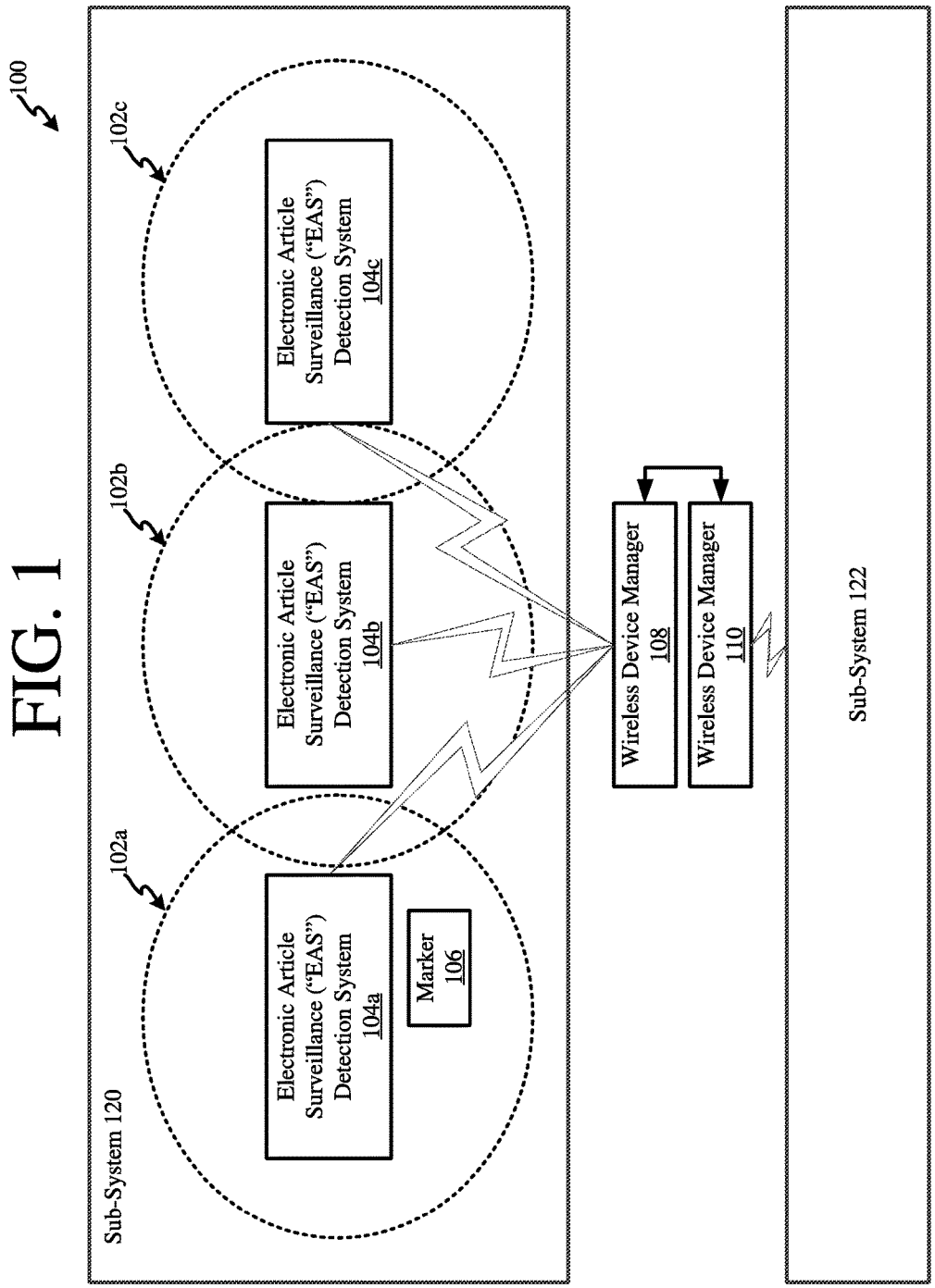
FIG. 1 is a schematic illustration of an illustrative system.

It will be readily understood that the components of the present solution as generally described herein and illustrated in the appended figures could be arranged and designed in a wide variety of different configurations. Thus, the following more detailed description of the present solution, as represented in the figures, is not intended to limit the scope of the present disclosure, but is merely representative of various implementations. While the various aspects of the the present solution are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The EAS systems used today are time based and get their synchronization from a zero crossing of an AC line. The term zero crossing, as used herein, refers to a point where a signal of a mathematical function changes (e.g., from positive to negative) represented by a crossing (zero value) of an axis in a graph of the function. In a current networked configuration, a synchronization signal is originated at a WDM and is provided to an end device via a wireless signal. In practice, it is known that the zero crossing of the wirelessly transmitted synchronization signal at the WDM can be very different from the zero crossing local of the same signal at the end device. The issue arises when a WDM is compromised in some way which results in a lost synchronization signal at the end device. If the end device loses the synchronization signal, it stops functioning. Obviously, this is not a desired result. The EAS function is paramount to the customer, and the customer would not expect the end device to be interrupted due to an issue with the WDM.

Accordingly, the present solution concerns systems and methods for tracking a delta between the wirelessly transmitted zero crossing and the native zero crossing at the end device. If the wirelessly transmitted zero crossing is compromised, the end device would know the delta from the native zero crossing at the local AC signal. So, once a certain number of zero crossing cycles was missed, the end device would utilize the local AC zero crossing reference plus/minus the correction factor or delta that was derived from the signal that the WDM was previously transmitting.

The zero crossing delay can be measured in degrees or fractions of a second. Most of the time, the delay is referred to in seconds which is the easiest to understand and communicate. In the new wireless networked configuration, an end device receives its synchronization signal from the WDM. Knowing that synchronization of the EAS systems is vital to their performance, and that the zero crossing location (in time) can be different in different locations within a retail environment, there is a critical concern of the synchronization being lost from the WDM. The solution involves a tracking method which continuously compares the Wireless zero crossing signal to the local AC source zero crossing signal. Once a specific number of zero crossing events are missed from the WDM, the end device would default to the local end device AC source zero crossing signal plus/minus the "correction factor or delta" that was derived from the signal that the WDM was previously transmitting. Phase delays in supplied AC is typically associated with transformer loading effects and usually doesn't change quickly in the retail environment. Building of a new store or a store closing are events that could be associated with transformer loading effects for reference. Once the WDM signal was restored, the end device would switch back to using that signal as the AC zero crossing source. As before, the unit would then start to again track the "correction factor or delta" from the local power source.

Referring now to FIG. 1, there is provided an illustration of an illustrative system 100. System 100 comprises two or more subsystems 120, 122 and WDMs 108, 110. The WDMs 108, 110 are configured to respectively wirelessly communicate with the subsystems 120, 122. The wireless communications can be achieved a wireless communication technology. Wireless communication technologies are well known in the art, and therefore will not be described herein. Any using any known or to be known wireless communication technology can be used herein without limitation. For example, the wireless communications are achieved using Radio Frequency ("RF") communications technology.

Each subsystems 120, 122 comprises a plurality of EAS detection systems. For example, subsystem 120 comprises EAS detection systems 104a, 104b, 104c. Each of the EAS detection systems 104a, 104b, 104c is configured to monitor an area 102a, 102b, 102c (e.g., within a certain range of the EAS detection systems) as is known to detect EAS markers 106 having a predetermined characteristic (e.g., frequency). The coverage for each area 102a, 102b, 102c may overlap with adjacent areas. Further, the EAS detection systems 104a, 104b, 104c may be configured to communicate information therebetween using any suitable communications links (e.g., a wired or wireless communications link). Each of the EAS detection systems 104a, 104b, 104c is also configured to wirelessly communicate with the WDM 108.

During operation, the WDM 108 communicates a synchronization signal to the EAS detection systems 104a, 104b, 104c for synchronizing transmit/receive operations thereof. The WDM 108 communicates a synchronization signal to WDM 110 for transmit/receive operations thereof. The time at which the synchronization signal is received is logged locally by the EAS detection systems 104a, 104b, 104c and/or WDM 110. This time is used to compute a delta (or difference) between a first zero crossing of an AC line signal supplied to the WDM 108 and a second zero crossing of an AC line signal supplied to the receiving device 104a, 104b, 104c, or WDM 110. The delta value is used in a backup mode for synchronizing transmit/receive operations when the WDM's synchronization signal is no longer being received by the device 104a, 104b, 104c or WDM 110 and/or phase delays are occurring as a result of transformer loading.

Figure 2:
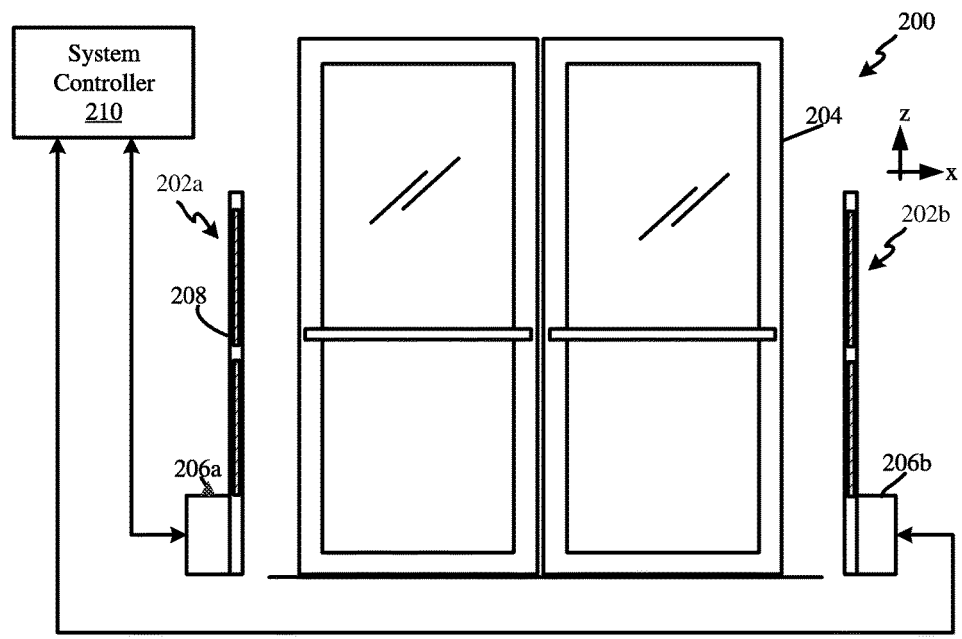
FIGS. 2-3 each provide an illustration that is useful for understating operations of an illustrative EAS detection system.
Figure 3:
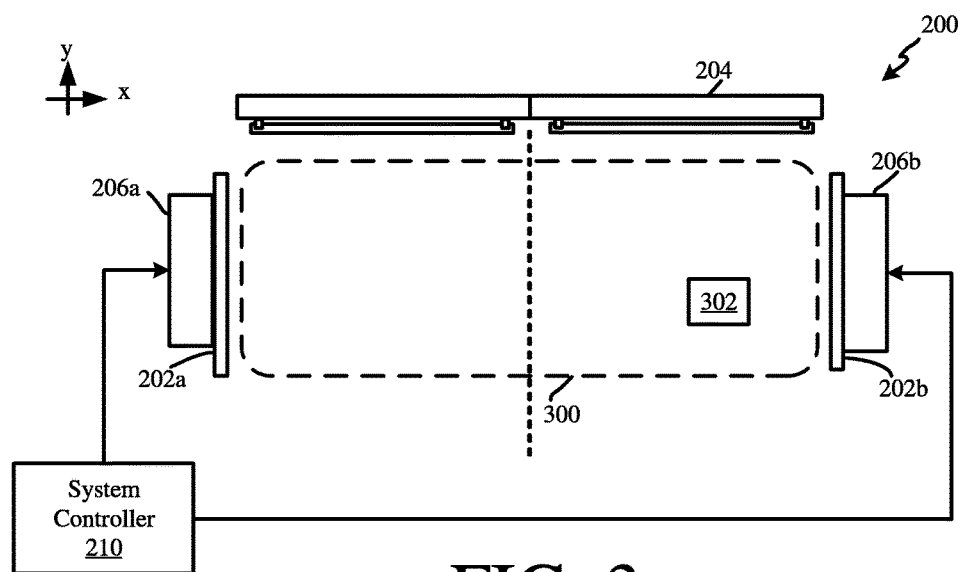

Referring now to FIGS. 2 and 3, there are provided illustrations of an illustrative EAS detection system 200. EAS detection system 104a, 104b, 104c of FIG. 1 is the same as or similar to EAS detection system 200 of FIG. 2. As such, the following discussion of EAS detection system 200 is sufficient for understanding EAS detection systems 104a, 104b, 104c of FIG. 1. EAS detection system 200 is described herein in terms of an AM EAS type detection system. However, the present solution can also be used in other types of EAS detection systems, including other types of magnetic based EAS detection systems.

The EAS detection system 200 will be positioned at a location adjacent to an entry/exit 204 of a secured facility (e.g., a retail store). The EAS detection system 200 uses specially designed EAS markers 302 which are applied to store merchandise or other items which are stored within a secured facility. The EAS markers 302 can be deactivated or removed by authorized personnel at the secure facility. For example, in a retail environment, the EAS markers 302 could be removed by a store employee (not shown). When an active EAS marker 302 is detected by the EAS detection system 200 in an idealized representation of an EAS detection zone 300 near the entry/exit, the EAS detection system 200 will detect the presence of such marker 302 and will sound an alarm or generate some other suitable EAS response, as described above. Accordingly, the EAS detection system 200 is arranged for detecting and preventing the unauthorized removal of articles or products from controlled areas. EAS marker 106 of FIG. 1 can be the same as or substantially similar to EAS markers 302.

The EAS detection system 200 includes a pair of pedestals 202a, 202b, which are located a known distance apart (e.g., at opposing sides of an entry/exit 204). The pedestals 202a, 202b are typically stabilized and supported by a base 206a, 206b. The pedestals 202a, 202b will each generally include one or more antennas 108 that are suitable for aiding in the detection of the special markers, as described herein. For example, pedestal 202a can include at least one antenna suitable for transmitting or producing an electromagnetic exciter signal field and receiving response signals generated by markers in the EAS detection zone 300. In some scenarios, the same antenna 208 can be used for both receive and transmit functions. Similarly, pedestal 202b can include at least one antenna 208 suitable for transmitting or producing an electromagnetic exciter signal field and receiving response signals generated by markers in the EAS detection zone 300. The antennas provided in pedestals 202a, 202b can be conventional conductive wire coil or loop designs as are commonly used in AM type EAS pedestals. These antennas will sometimes be referred to herein as exciter coils. In some scenarios, a single antenna can be used in each pedestal. The single antenna is selectively coupled to the EAS receiver. The EAS transmitter is operated in a time multiplexed manner. However, it can be advantageous to include two antennas (or exciter coils) in each pedestal as shown in FIG. 2, with an upper antenna positioned above a lower antenna.

The antennas 208 located in the pedestals 202a, 202b are electrically coupled to a system controller 210. The system controller 210 controls the operation of the EAS detection system 202 to perform EAS functions as described herein. The system controller 210 can be located within a base 206a, 206b of one of the pedestals 202a, 202b or can be located within a separate chassis at a location nearby to the pedestals. For example, the system controller 210 can be located in a ceiling just above or adjacent to the pedestals 202a, 202b.

As noted above, the EAS detection system comprises an AM type EAS detection system. As such, each antenna is used to generate an Electro-Magnetic ("EM") field which serves as a marker exciter signal (or interrogation signal). The marker exciter signal causes a response signal to be generated by the marker within an EAS detection zone 300. In some scenarios, the marker comprises a plurality of resonators having different lengths which facilitate the reception of the marker exciter signal having a first frequency and the generation of a response signal having a second different frequency. In other scenarios, the marker comprises two coils with a common core (e.g., a ferrite core). The present solution is not limited to the marker architectures of these two scenarios. Other marker architectures can be used herein.

Figure 4:
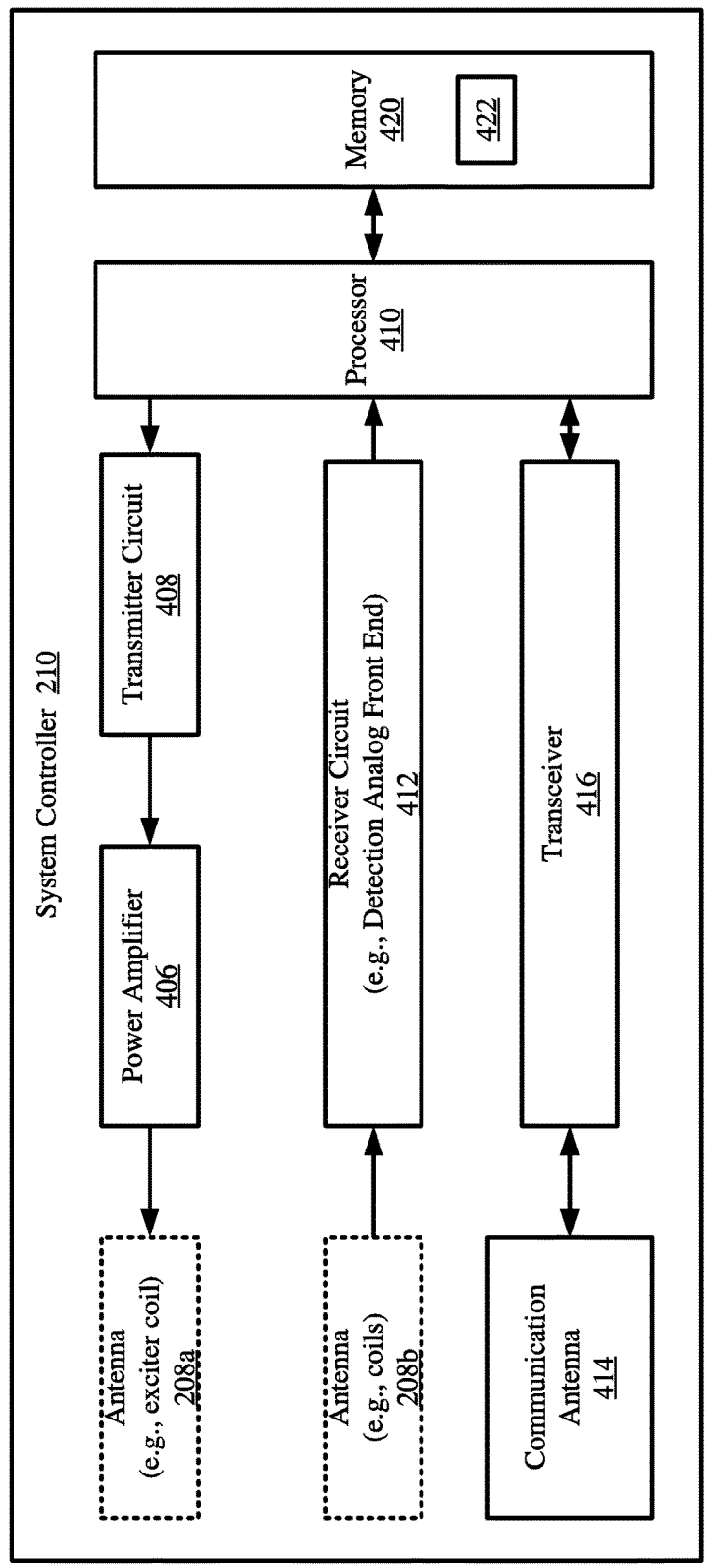
FIG. 4 is a block diagram of an illustrative architecture for a system controller.

Referring now to FIG. 4, there is provided an illustration of illustrative architecture for the system controller 210 of FIG. 2. The system controller 210 comprises a power amplifier 406, a transmitter circuit 408, a receiver circuit 412, a processor 410, and memory 420. Each of the listed components are well known in the art, and therefore will not be described in detail herein. It should be understood that the memory 220 and the processor 410 can constitute machine-readable media. The term "machine-readable media", as used here, refers to a single medium or multiple media (e.g., a centralized or distributed database, and/or associated caches and servers) that store the one or more sets of instructions 422. The term "machine-readable media", as used here, also refers to any medium that is capable of storing, encoding or carrying a set of instructions 422 for execution by the system controller 210 and that cause the system controller 210 to perform any one or more of the methodologies of the present disclosure.

As shown in FIG. 4, the transmitter circuit 408 is coupled to a first antenna 208a, and the receiver circuit 412 is coupled to a second antenna 208b. The first antenna 208a may be disposed in a first pedestal 202a of a pair of pedestals, and the second antenna 208b for the receiver circuit 412 may be disposed in a second pedestal 202b of the pair of pedestals. The present solution is not limited in this regard. For example, both antennas 208a and 208b can be contained in the same pedestal, and/or collectively comprise a single antenna.

The listed components 406-412 together define a marker monitoring control portion that controls the transmission from and reception of signals at an antenna 208a, 208b. The marker monitoring control portion can be provided in any known manner to control the transmissions and receptions at the interrogation antenna 402 to monitor for EAS markers 302 within an interrogation zone 300. The system controller 210 also includes a communication antenna 414 and a transceiver 416 to provide wireless communications between the system controller 210 and external devices, such as different controllers in one or more EAS detection systems and/or WDMs (e.g., WDMs 108 and/or 110 of FIG. 1).

The operations of the marker monitoring control portion will now be described in more detail. The transmitter circuit 408 is coupled to the first antenna 208a via the power amplifier 406. The first antenna 208a emits transmit (e.g., "Radio Frequency ("RF")) bursts at a predetermined frequency (e.g., 58 KHz) and a repetition rate (e.g., 50 Hz, 60 Hz, 75 Hz or 90 Hz), with a pause between successive bursts. In some scenarios, each transmit burst has a duration of about 1.6 ms. The transmitter circuit 408 is controlled to emit the aforementioned transmit bursts by the processor 410, which also controls the receiver circuit 412. The receiver circuit 412 is coupled to the second antenna 208b. The second antenna 208b comprises close-coupled pick up coils of N turns (e.g., 100 turns), where N is any number. When the EAS marker 302 resides between the antennas 208a, 208b as shown in FIG. 3, the transmit bursts transmitted from the transmitter circuit 408 cause a response signal to be generated by the EAS marker 302.

The processor 410 controls activation and deactivation of the receiver circuit 412. When the receiver circuit 412 is activated, it detects signals at the predetermined frequency within receiver windows, such as RX windows 504, 506, 508 of FIG. 5. In the case that a transmit burst has a duration of about 1.6 ms, a first receiver window 504 will have a duration of about 1.7 ms which begins at approximately 0.4 ms after the end of the transmit burst. During the first receiver window 504, the receiver circuit 412 integrates any signal at the predetermined frequency which is present. In order to produce an integration result in the first receiver window 504 which can be readily compared with the integrated signal from the second receiver window 506, the signal emitted by the EAS marker 302 should have a relatively high amplitude (e.g., greater than or equal to about 1.5 nanowebers (nWb)).

After signal detection in a first receiver window 504, the processor 410 deactivates the receiver circuit 412, and then re-activates the receiver circuit 412 during the second receiver window 506 which begins at approximately 6 ms after the end of the aforementioned transmit burst. During the second receiver window 506, the receiver circuit 412 again looks for a signal having a suitable amplitude at the predetermined frequency. Since it is known that a signal emanating from the EAS marker 302 will have a decaying amplitude, the receiver circuit 412 compares the amplitude of any signal detected at the predetermined frequency during the second receiver window 506 with the amplitude of the signal detected during the first receiver window 504. If the amplitude differential is consistent with that of an exponentially decaying signal, it is assumed that the signal did, in fact, emanate from an EAS marker 302 between antennas 208a, 208b. In this case, the receiver circuit 412 issues an alarm.

Figure 5:
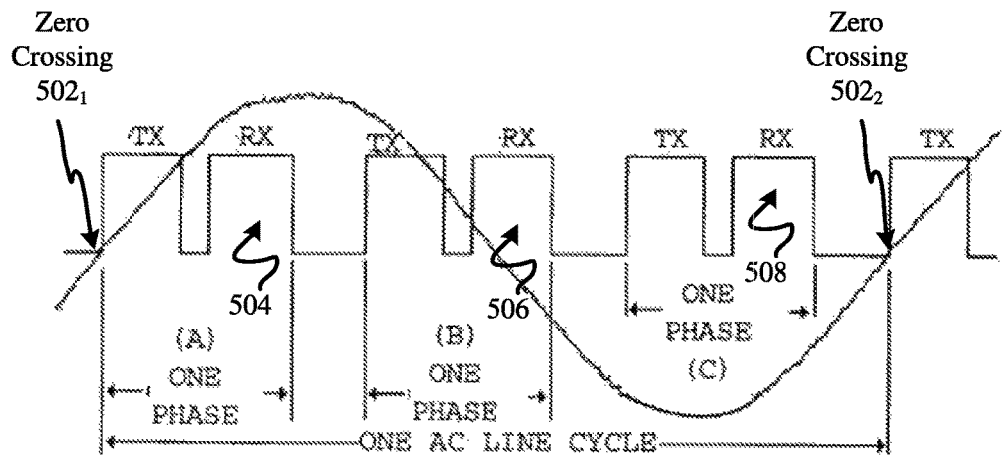
FIG. 5 provides a timing diagram useful in explaining the manner in which phases of operation at an EAS detection system are determined with respect to AC power line zero crossings.

Referring now to FIG. 5, there is provided a timing diagram useful in explaining the manner in which phases of operation at an EAS detection system (e.g., EAS detection system 104a, 104b or 104c of FIG. 1) are determined with respect to AC power line positive zero crossings $502_1$, $502_2$. Pulsed magnetic receivers (e.g., receiver circuit 412 of FIG. 4) typically examine three time windows to scan for the presence of magnetic markers (e.g., marker 106 of FIG. 1 and/or marker 302 of FIG. 3). With a 60 Hz power line frequency, for example, the first receiver window 504 (referred to as phase A) occurs nominally 2 millisecond (msec) after the receiver's local positive zero crossing $502_1$. The second receiver window 506 (referred to as phase B) occurs 7.55 nsec after the local positive zero crossing $502_1$. The third receiver window 508 (referred to as phase C) occurs 13.1 msec after the local positive zero crossing $502_1$. At 50 Hz power line frequencies, the timing is analogous. Each receiver window begins a nominal 2 msec after either the 0°, 120° or 240° point in the line frequencies period.

Figure 6:
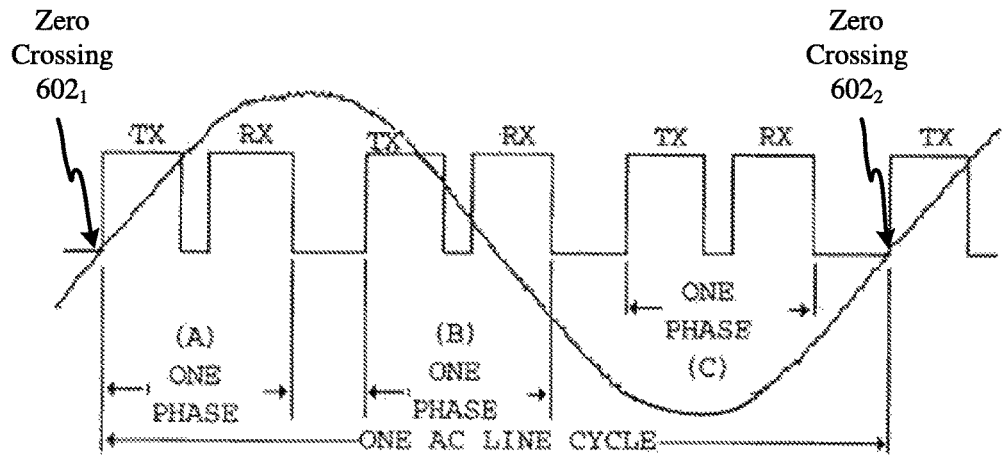
FIG. 6 provides a timing diagram useful in explaining the manner in which phases of operation at a WDM are determined with respect to AC power line zero crossings.

Referring now to FIG. 6, there is provided a timing diagram useful in explaining the manner in which phases of operation at a WDM (e.g., WDM 108 or 110 of FIG. 1) are determined with respect to AC power line positive zero crossings $602_1$, $602_2$. Notably, the timing diagram of FIG. 6 is the same as the timing diagram of FIG. 5. Therefore, the discussion provided above in relation to FIG. 5 is sufficient for understanding the timing diagram of FIG. 6.

Figure 7:
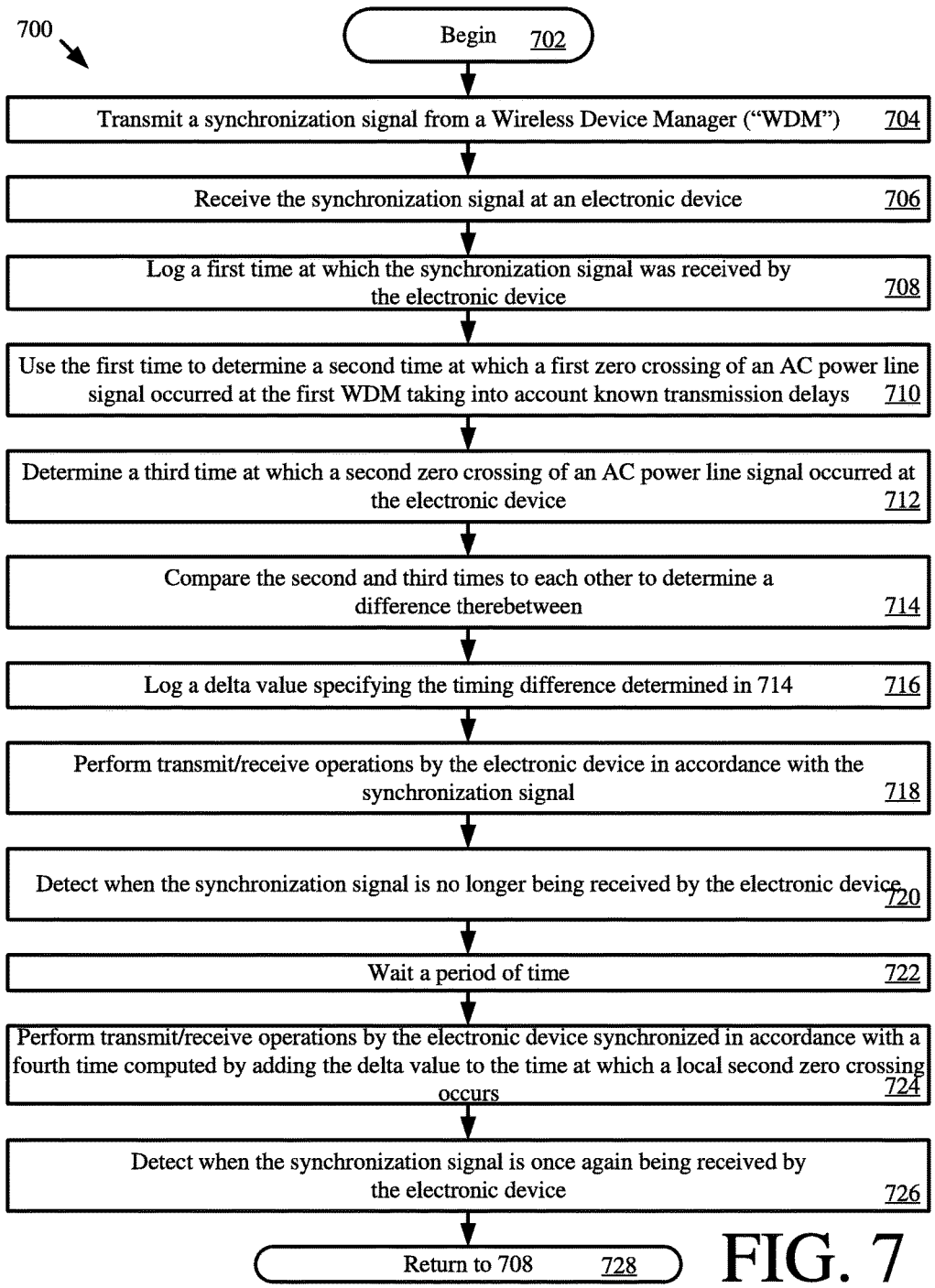
FIG. 7 is a flow diagram of an illustrative method for operating an EAS system.

Referring now to FIG. 7, there is provided a flow diagram of an illustrative method 700 for operating an EAS system. Method 700 begins with 702 and continues with 704 where a synchronization signal is transmitted from a WDM (e.g., WDM 108 of FIG. 1). In 706, the synchronization signal is received at an electronic device (e.g., EAS detection system 104a, 104b, 104c of FIG. 1 or WDM 110 of FIG. 1). The receiving device performs operations in 708 to log a first time at which the synchronization signal was received thereby. The first time is used in 710 by the receiving device to determine a second time at which a first zero crossing (e.g., positive zero crossing $602_1$ of FIG. 6) of an AC power line signal occurred at the WDM. This determination takes into account known transmission delays. Next in 712, a third time is determined at which a second zero crossing (e.g., positive zero crossing $502_1$ of FIG. 5) of an AC power line signal occurred at the electronic device. The second and third times are compared to each other in 714 in order to determine a timing difference therebetween. A delta value is logged in 716 that specifies the timing difference determined in 714. The delta value can be in seconds, degrees of a second, or fractions of a second. Thereafter in 718, the electronic device performs transmit/receive operations synchronized in accordance with the synchronization signal.

As shown by 720, the synchronization signal may stop being received by the electronic device. For example, if the WDM experiences a power loss, then the synchronization signal will not be transmitted therefrom. Also, if a transmission of the WDM experiences interruption, then the synchronization signal may not be received by the electronic device. Pulse delays caused by transformer loading may also result in the synchronization signal being no longer received by the electronic device. After such a detection is made, the electronic device waits a period of time. This period of time can be pre-specified. For example, the period of time is selected to be long enough to encompass a certain number of WDM positive zero crossing events (e.g., 30).

Upon the expiration of the period of time, the electronic device performs transmit/receive operations synchronized in accordance with a fourth time computed by adding the delta value to the time at which a local second zero crossing occurs, as shown by 724. The electronic device also perform operations in 726 to detect when the synchronization signal is once again received thereby. In response to this detection, method 700 returns to 708 so that the process is once again repeated and the transmit/receive operations of the electronic device are once again synchronized using the synchronization signal (as opposed to the local AC power signal).

Figure 8:
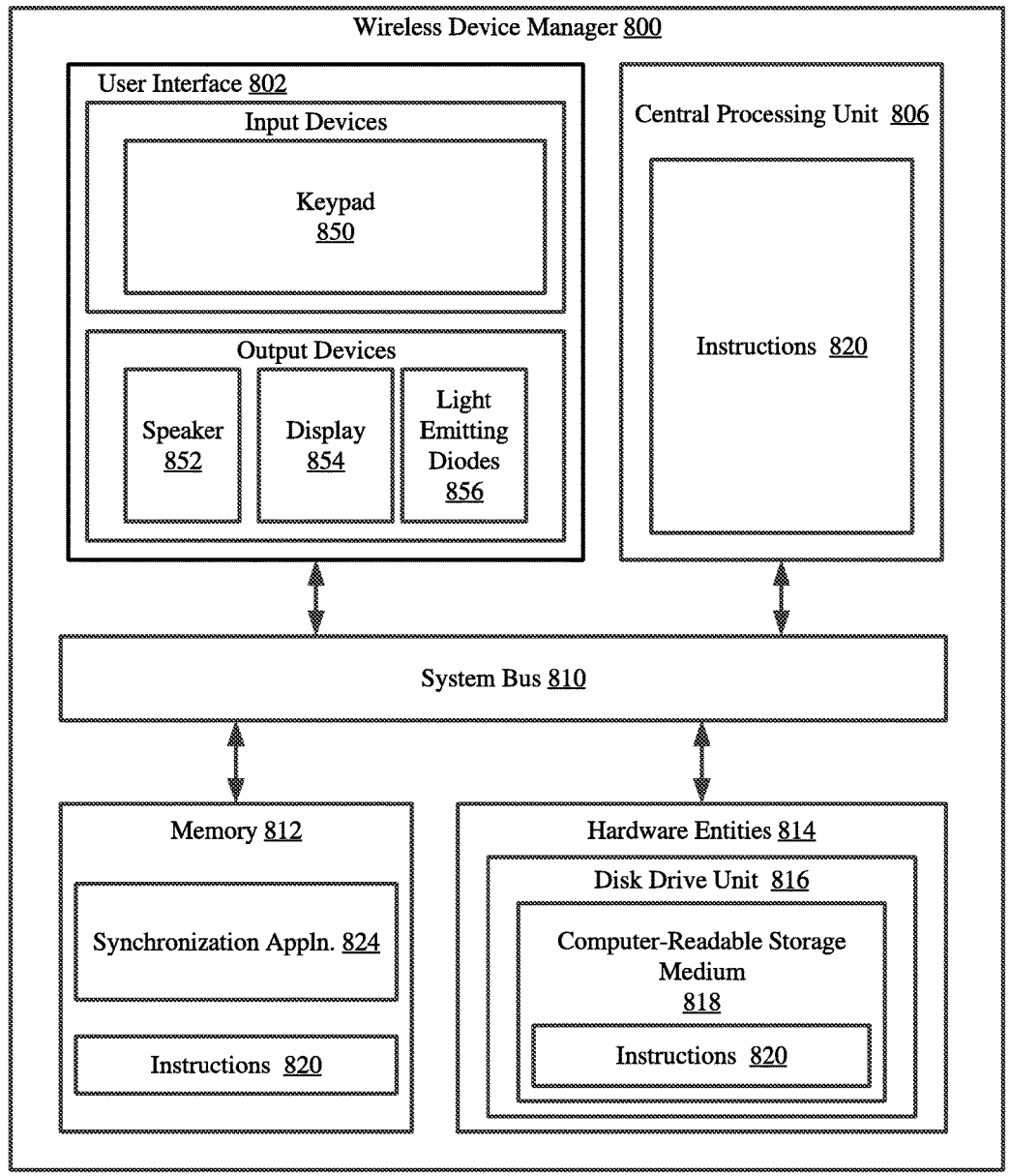
FIG. 8 is a block diagram of an illustrative WDM architecture.

Referring now to FIG. 8, there is provided a block diagram of an illustrative architecture for a WDM 800. WDMs 108, 110 of FIG. 1 are the same as or substantially similar to WDM 800. As such, the following discussion of WDM 800 is sufficient for understanding WDMs 108 and/or or 110.

Notably, the WDM 800 may include more or less components than those shown in FIG. 8. However, the components shown are sufficient to disclose an illustrative implementation of the present solution. The hardware architecture of FIG. 8 represents one illustrative architecture of a representative WDM configured to facilitate the provision of networked EAS systems with synchronized tracking. As such, the WDM 800 of FIG. 8 implements at least a portion of a method for operating an EAS system. Some or all the components of the WDM 800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the WDM 800 comprises a user interface 802, a Central Processing Unit ("CPU") 806, a system bus 810, a memory 812 connected to and accessible by other portions of WDM 800 through system bus 810, and hardware entities 814 connected to system bus 810. The user interface can include input devices (e.g., a keypad 850) and output devices (e.g., speaker 852, a display 854, and/or light emitting diodes 856), which facilitate user-software interactions for controlling operations of the WDM 800.

At least some of the hardware entities 814 perform actions involving access to and use of memory 812, which can be a Random Access Memory ("RAM"), a disk driver and/or a Compact Disc Read Only Memory ("CD-ROM"). Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the WDM 800. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the WDM 800 and that cause the WDM 800 to perform any one or more of the methodologies of the present disclosure.

In some scenarios of the present solution, the hardware entities 814 include an electronic circuit (e.g., a processor) programmed for facilitating the provision of networked EAS systems with synchronized tracking. In this regard, it should be understood that the electronic circuit can access and run a synchronization application 824 installed on the WDM 800. The software application 824 is generally operative to facilitate the methods of operating an EAS system as discussed herein. Functions of the software application 824 are apparent from the forgoing discussion of the present solution.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for operating an Electronic Article Surveillance ("EAS") system, comprising:
   receiving, by an electronic device, a synchronization signal transmitted from a remote Wireless Device Manager ("WDM");
   performing first transmit and receive operations at the electronic device that are synchronized in accordance with a zero crossing of an AC power line supplied to the remote WDM;
   detecting when the synchronization signal is no longer being received by the electronic device;
   determining a delta value between a first time at which the zero crossing of the AC power line supplied to the remote WDM occurred and a second time at which a zero crossing of an AC power line supplied to the electronic device occurred;
   converting the delta value into a delay value using a third time at which another zero crossing of the AC power line supplied to the electronic device occurs; and
   performing second transmit and receive operations at the electronic device that are synchronized in accordance with the delay value, when the synchronization signal has not been received by the electronic device for a specified period of time.

2. The method according to claim 1, wherein the electronic device comprises an EAS detection system or a WDM other than the remote WDM.

3. The method according to claim 1, further comprising logging a receive time at which the synchronization signal is received by the electronic device.

4. The method according to claim 3, further comprising using the receive time to determine the first time at which the zero crossing of the AC power line supplied to the remote WDM occurred taking into account known transmission delays.

5. The method according to claim 4, further comprising determining the second time at which the zero crossing of the AC power line supplied to the electronic device occurred.

6. The method according to claim 1, further comprising detecting when the synchronization signal is once again being received by the electronic device.

7. The method according to claim 6, further comprising performing third transmit and receive operations by the electronic device that are synchronized in accordance with the synchronization signal, when the synchronization signal is once again being received by the electronic device.

8. A system, comprising:
   a processor; and
   a non-transitory computer-readable storage medium comprising programming instructions that are configured to cause the processor to implement a method for operating an Electronic Article Surveillance ("EAS") system, wherein the programming instructions comprise instructions to:
      receive a synchronization signal transmitted from a remote Wireless Device Manager ("WDM");
      perform first transmit and receive operations that are synchronized in accordance with a zero crossing of an AC power line supplied to the remote WDM;
      detect when the synchronization signal is no longer being received by the system;
      determine a delta value between a first time at which the zero crossing of the AC power line supplied to the remote WDM occurred and a second time at which a zero crossing of an AC power line supplied to the electronic device occurred;
      converting the delta value into a delay value using a third time at which another zero crossing of the AC power line supplied to the electronic device occurs; and
      perform second transmit and receive operations that are synchronized in accordance with the delay value, when the synchronization signal has not been received by the system for a specified period of time.

9. The system according to claim 8, wherein the system comprises an EAS detection system or a WDM other than the remote WDM.

10. The system according to claim 8, wherein the programming instructions further comprise instructions to log a receive time at which the synchronization signal is received by the system.

11. The system according to claim 10, wherein the programming instructions further comprise instructions to use the receive time to determine the first time at which the zero crossing of the AC power line supplied to the remote WDM occurred taking into account known transmission delays.

12. The system according to claim 11, wherein the programming instructions further comprise instructions to determine the second time at which the zero crossing of the AC power line supplied to the electronic device occurred.

13. The system according to claim 8, wherein the programming instructions further comprise instructions to detect when the synchronization signal is once again being received by the system.

14. The system according to claim 13, wherein the programming instructions further comprise instructions to perform third transmit and receive operations by the system that are synchronized in accordance with the synchronization signal, when the synchronization signal is once again being received by the system.

* * * * *